Jan. 14, 1964
W. L. ACKER ETAL
3,117,494
BROACHING APPARATUS
Filed Nov. 23, 1960
3 Sheets-Sheet 1
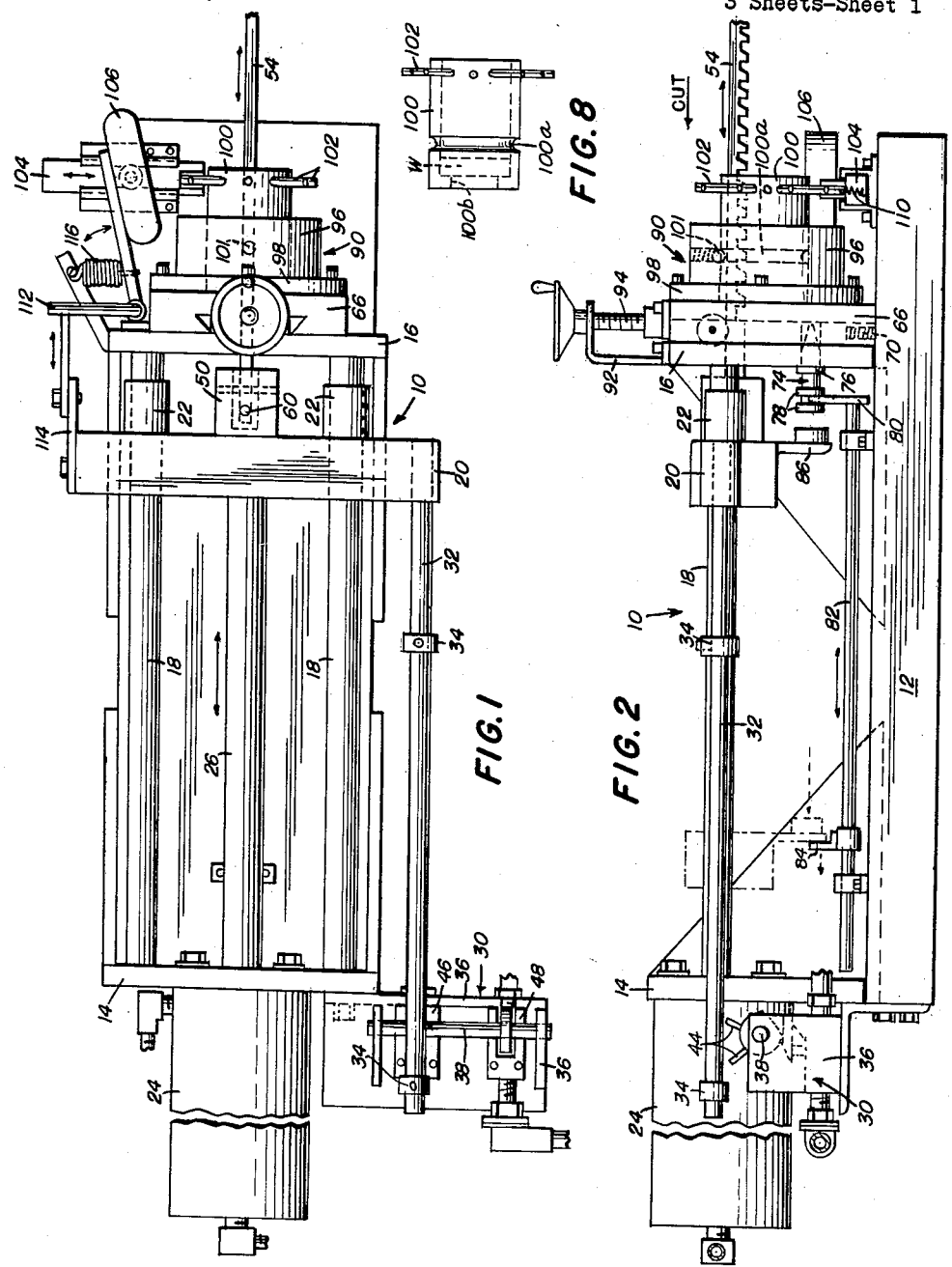
INVENTORS
WILLIAM L. ACKER
PETER BOEZI
BY Beale & Jones
ATTORNEYS Jan. 14, 1964 W. L. ACKER ETAL 3,117,494
BROACHING APPARATUS
Filed Nov. 23, 1960 3 Sheets-Sheet 2

INVENTORS
WILLIAM L. ACKER
PETER BOEZI
BY Beale & Jones
ATTORNEYS

Jan. 14, 1964  W. L. ACKER ETAL  3,117,494
BROACHING APPARATUS
Filed Nov. 23, 1960  3 Sheets-Sheet 3
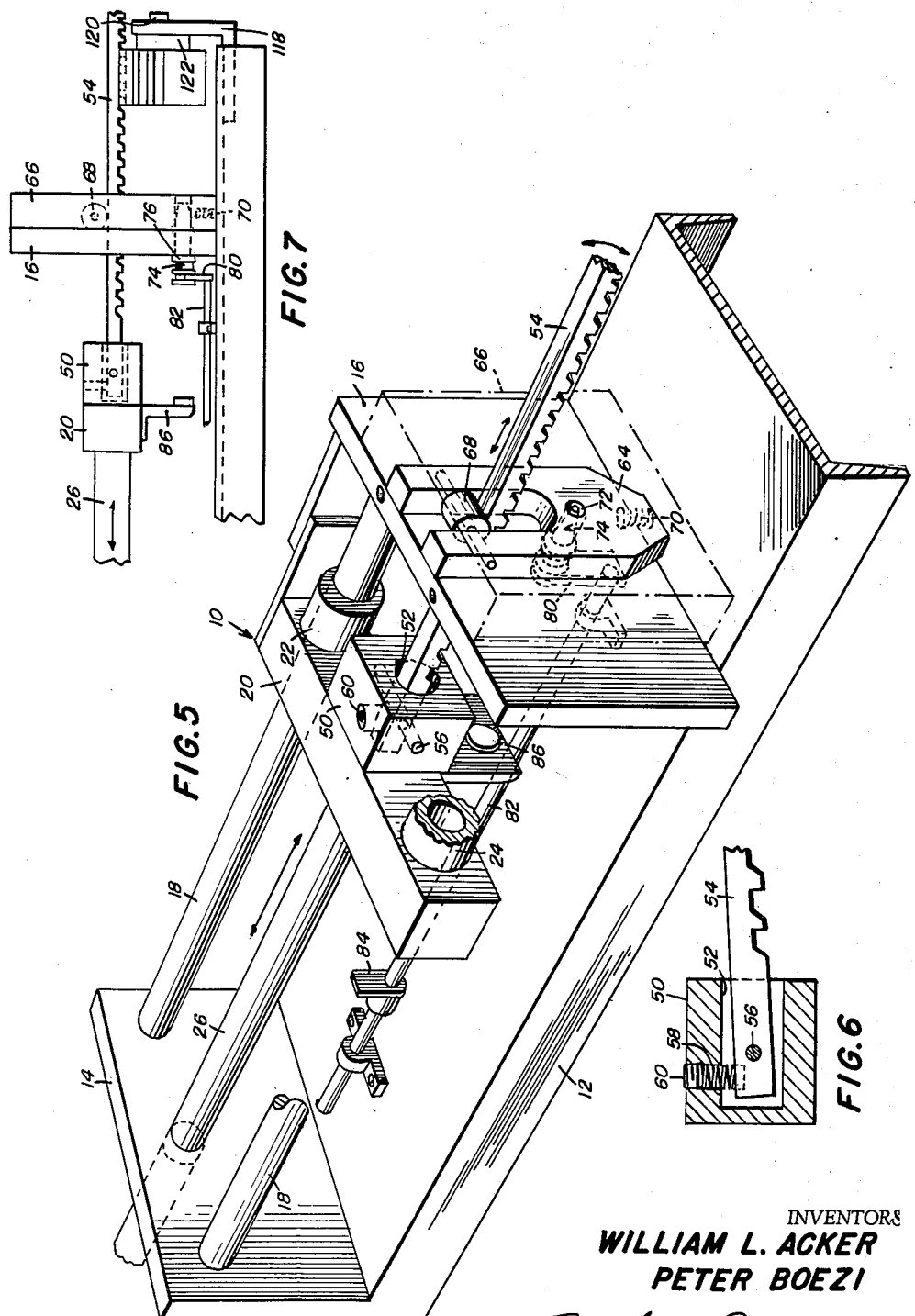
INVENTORS
WILLIAM L. ACKER
PETER BOEZI
BY Beale & Jones
ATTORNEYS

United States Patent Office 3,117,494
Patented Jan. 14, 1964

3,117,494
BROACHING APPARATUS
William L. Acker, La Plume, and Peter Boezi, 178-A, R.D. 2, Moscow, Pa.
Filed Nov. 23, 1960, Ser. No. 71,243
6 Claims. (Cl. 90—95)

This invention relates to a broaching apparatus. More specifically, this invention relates to a broaching apparatus having a reciprocating cutter and means to hold down the cutter during the workstroke, said means releasing the cutter so that it may move away from the work during the idle stroke of the cutter. The apparatus also includes means biasing the cutter away from the work.

The broaching apparatuses of the prior art have generally comprised a cutter blade and means to reciprocate it. The blade has been continually held in a single linear disposition and moved against the work. Because the cutter blade has been in contact with the workpiece during all of its movement, there is an undesirable wearing of the blade during the idle or return stroke. There is also interference with the cutter during removal of the workpiece. One prior device has its reciprocating cutter pivotally mounted and held by cam means against the workpiece only in a selected zone of the reciprocation of the blade. Even with this earlier device, however, the cutter engages the workpiece on the return stroke.

Other prior art devices such as vertical key seaters have relied on gravity-biased pivoted arms to urge the blade aginst the workpiece during the downward workstroke, the arm rising to permit the blade to withdraw from the work during the idle or upstroke of the cutter. Reliance on gravity rather than a positive force, however, has been found not satisfactory and undependable in broaching where considerable pressures are involved.

Under the present invention, positive means are provided to hold down the cutter against the workpiece during the workstroke and means are provided to release and urge the cutter away from the workpiece during the idle stroke. This arrangement has a number of advantages over the prior art. First, as to force and surety of operation a device embodying the present invention has the force and effectiveness of workstroke of prior devices. In addition, whereas the blade of our device only contacts the workpiece on the workstroke, it is possible to return the blade at the end of its workstroke and to feed the work upward for a second cut in the same groove. With prior devices it has not been possible to take two or more consecutive broaching cuts in the same slot or groove without stopping the machine or removing the work. Also, with our device, because the blade is remote from the workpiece between workstrokes, the workpiece can be removed and new workpieces can be inserted without disconnecting the broach, as has been formerly necessary.

It is therefore an object of this invention to provide a broaching apparatus having positive means to hold down the cutter blade against the work during the workstroke and to permit withdrawal of the blade away from the work during the idle stroke.

It is a further object of this invention to provide a broaching apparatus of simple construction and foolproof operation.

This invention embodies other novel features, details of construction and arrangement of parts which are hereinafter set forth in the specification and claims, and illustrated in the accompanying drawings, wherein:

FIG. 1 is a top plan view of a broaching apparatus embodying the invention;

FIG. 2 is a side elevational view of a broaching apparatus embodying the invention;

FIG. 5 is a perspective view of a broaching apparatus embodying the invention and having portions broken away and removed to expose the operation of the cutter holddown means. The vertical guide housing is indicated in broken lines;

FIG. 6 is an enlarged fragmentary sectional view showing the pivotal mounting of the cutter in a broaching apparatus embodying the invention;

FIG. 7 is a reduced fragmentary side elevational view showing a broaching apparatus of the invention operating on the exterior on a workpiece; and FIG. 8 is a side elevational view of the workpiece-holding collar.

Figure 3:
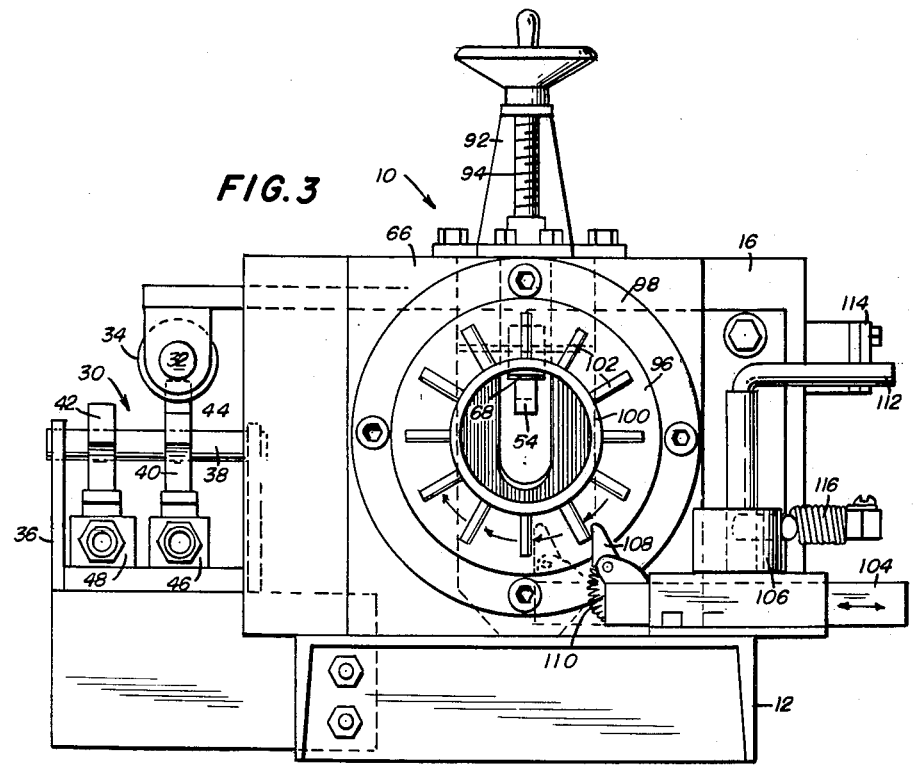
FIG. 3 is a front end view of a broaching apparatus embodying the invention.
Figure 4:
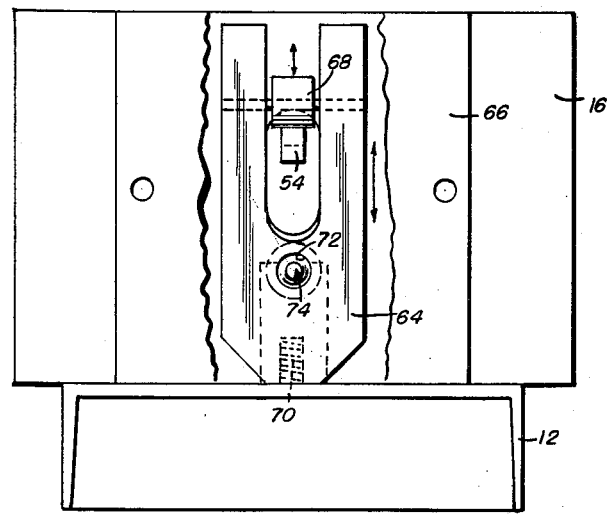
FIG. 4 is a front end elevational view of a broaching apparatus embodying the invention and having the workpiece holder removed to expose the cutter hold down means.

Briefly, the invention is a broaching apparatus comprising a frame including horizontal guide means having a crosshead mounted thereon for reciprocation. A cutter blade has one end pivotally mounted on the crosshead, and spring means bias the distal end of the cutter blade upwardly. Hold-down means are provided for the cutter blade during its workstroke, said hold-down means being engaged and released by cam means activated by the cross head as it reciprocates.

More specifically, a broaching apparatus embodying the invention is shown in FIG. 1 and is generally designated 10. The apparatus comprises a frame including a horizontally disposed bed 12 having at one end thereof a vertically upstanding foot member 14. Spaced away from the foot member is a vertically upstanding head member 16. Secured to and extending between the head member and the foot member and spaced above the bed member are a pair of parallel horizontal guide rods 18. Mounted on the horizontal guide rods is a horizontally disposed crosshead 20 which includes a pair of spaced openings slidably receiving respectively, the two horizontal guide rods. The openings may have bushings 22 which extend toward the head member 16.

Mounted on the outside of the foot member from the bed member is a pneumatic cylinder 24 operatively confining a piston head (not shown) which has an integral connecting rod 26 extending through the foot member 14 and has its distal end attached to the crosshead 20. The cylinder is supplied with compressed air alternately through connections on opposite sides of the piston so that a reciprocating motion of the piston, and therefore the crosshead 20, is achieved.

Means for alternately connecting the air pressure supply to the two inlets in the opposite ends of the cylinder are generally designated 30 and comprise a valve actuator rod 32 secured to and extending back from the crosshead 20. As shown in FIG. 2 the actuator rod 32 has adjustable sleeves 34. Mounted for oscillation in a subframe 36 adjacent the main frame is a horizontally disposed shaft 38 carrying a pair of spaced cams 40 and 42. Upstanding from cam 40 are a pair of peripherally spaced radially directed fingers 44. These fingers are engaged alternately by sleeves 34 as rod 32 reciprocates. Disposed under the cams are a pair of valves 46 and 48 communicating with a pressure source and also with the parts of the cylinder respectively by means not shown. The valves are of the button-actuator type and are arranged so that as the shaft 38 is oscillated the cams depress them conducting high pressure air to first one cylinder port and then to the other.

As is clearly shown in FIG. 5 the front end of the crosshead 20 rigidly mounts a cutter blade mounting block 50. Block 50 has a deep opening 52 in the front face thereof, and a cross bore of smaller diameter directed laterally intersects the opening. In assembly, a cutter blade 54 having an aperture therein is inserted through the opening 52 and a pin 56 is driven in through the cross bore and through the aperture. Thus, the cutter blade and the block 50 are pivotally related. On the top of the cutter blade mounting block is a threaded bore extending down into the first opening. The bore receives a coil spring 58 the lower end of which engages the upper surface of the cutter blade and urges the inward end of the cutter blade in a downward direction. A set screw 60 is disposed in the upper portion of the bore and may be adjusted to increase or decrease pressure on the blade.

As is shown in FIG. 5, the cutter blade 54 extends freely through an opening in the head member 16 of the frame. Mounted for vertical reciprocation against the front face of the head member is a generally U-shaped yoke 64 straddling the blade 54 and held in position by guide means in the form of a guide housing 66 (see FIG. 1). Journalled between the legs of the U-shaped yoke 64 and spaced above the bight thereof is a roller 68 freely rotatable and adapted to engage the upper surface of the cutter blade 54. A small spiral spring 70 is held in compression between the lower end of the yoke 64 and the upper face of the bed 12 to urge the yoke member upwardly.

As is shown in FIGS. 1 and 2, the bight of the yoke has a cylindrical opening 72 disposed horizontally therein. Adjacent this opening a similar opening is disposed in the head member 16. A pin cam 74 having a tapered forward end slidably fits in the opening in the head member 16 and is adapted for axial reciprocation therein. A bushing 76 as shown in FIG. 2 may surround the opening in the head member to hold the pin cam against lateral wobbling. From FIG. 2 it may also be seen that as the pin cam is partially withdrawn from the opening in the head member the yoke 64 is permitted to rise, driven upwardly by the pressure of the yoke spring 70. When, on the other hand, the pin cam is driven home, its camlike point urges the cutter blade hold-down yoke down into its engaged working position. Thus, it may be seen that when the pin is partially withdrawn from its home position the cutter blade is allowed to raise upwardly whereas when the pin is driven home the cutter blade is lowered to its working position and held in place.

Means for reciprocating the pin cam 74 includes a pair of annular ribs 78 formed about the rear end of the pin. These ribs are engaged between the legs of a bifurcated plate 80 vertically disposed on the end of a cam drive rod 82 mounted for horizontal reciprocation in a pair of spaced journal members securely mounted to the bed 12. Adjustably mounted on the cam drive rod 82 is a trigger lug 84 disposed intermediate the drive rod journals. The means for driving the rod are completed by a trigger actuator and hammer 86 depending from the front end of the crosshead 20. The forward portion of this member comprises a hammer adapted to engage the head of the pin cam 74 and to drive it home as the crosshead advances toward the end of its travel toward the head member 16. The rear end of the member comprises a trigger actuator which when the crosshead withdraws to the end of its travel toward the foot member engages the trigger lug 84 to withdraw the cam pin.

It can be seen that the cutter blade 54 is held down during the stroke of the crosshead toward its cylinder and is released to "float" away from the work urged by spring 58 during the idle stroke.

*Means for Holding Workpiece*

Means for holding a workpiece while the cutter member is working internally on the workpiece are shown in FIGS. 1 and 2 and generally designated 90. Secured to the top of the head member 16 is an upwardly extending finger 92. Adjacent its distal end the finger turns rightwardly as shown in FIG. 2 and is apertured to support adjusting screw 94 topped by a turn crank. The lower end of the drive screw is threadedly received by a tapped aperture in a boss mounted on top of the vertical guide housing 66. A mounting drum 96 has an integral flange 98 by which it is bolted against guide housing 66. The drum has a horizontal opening and slideably receives a collar 100. Collar 100 has an annular groove 100a about its periphery and is held in place by a spring detent 101 mounted in the wall of the drum and engaging the groove in snap installation. As shown in FIGS. 1 and 3, clamp collar 100 has adjacent its front end a plurality of radially extending spokes 102.

FIG. 8 shows the workpiece-holding collar and indicates in broken lines an inwardly directed annular flange 100b adjacent the end of the collar nearest head member 16. The workpiece W is adapted to butt against this head during the cutting stroke of the blade. Since there is no contact of the blade against the workpiece on the idle stroke, lateral support of the workpiece on the opposite side is not necessary. It will be understood that a collar of appropriate internal configuration can be provided to operate on a given workpiece, the collars being interchangeable in the drum 96 in snap installation.

By means of the apparatus discussed above, the workpiece is held within the collar and may be adjusted vertically by turning the adjusting screw 94 to feed the workpiece upwardly as desired.

Means for indexing the collar 100 around comprises an index bar 104 mounted in a housing on the bed 12. The housing has a slot running longitudinally on its upper wall and through the slot a flat stud is attached to it. As shown in FIG. 3, the index bar 104 carries adjacent its forward end a pair of upstanding ears which pivotally mount a finger 108 adapted to successively engage the spokes 102. As shown, the finger is biased away from the spokes 102 by a compression spring 110. Stop means (not shown) keep the finger from pivoting farther out away from the vertical centerline of the apparatus. Because of this construction, when the bar is moved inward, finger 108 engages a spoke to move the collar clockwise, on return, the finger snaps past the adjacent spoke without turning the collar. Thus, as index bar reciprocates, the collar is stepped around. Means for reciprocating the index rod comprise the crank arm 112 actuator journalled in the head member 16 and comprising a central vertical shaft and a pair of offset horizontal shafts. The upper horizontal shaft is moved by a rod 114 extending forwardly from the side of the crosshead 20 as shown and the lower horizontal shaft engages the flat stud 106 below. A spiral spring 116 biases the crank arm in the counterclockwise disposition as shown in FIG. 1.

FIG. 7 shows means for mounting the workpiece so that the cutter blade may be used to operate externally on the workpiece as in forming external gears. The means may merely comprise upstanding arm 118 securely attached to the bed member 12 and having bolt means 120 securing the workpiece thereon. If desired, a collar 122 may be used to space the workpiece from the arm.

As can be easily imagined, the same indexing means used for internal working as shown in FIGS. 1, 2, etc., can also be adapted to drive around a workpiece worked on externally as disclosed in FIG. 7.

Thus, it may be seen that we have developed a broaching apparatus which provides positive cam-actuated means to hold down the cutter blade and yet which permits raising of the blade during the idle or return stroke. This enables the workpiece to be adjusted and even removed between workstrokes without exercise of force and without disconnecting the blade, an advantage long needed in the art.

While this invention has been shown in but one form it will be obvious to those skilled in the art that it is not so limited but is susceptible of various changes and modifications without departing from the spirit of the scope of the claimed invention.

We claim:

1. A broaching apparatus comprising horizontal guide means, a crosshead mounted for reciprocation on said horizontal guide means, power means to drive said crosshead, an elongated cutter blade having one end pivotally attached to said crosshead, means biasing the distal end of said cutter blade in an upward direction, movable hold-down means for said cutter blade positioned adjacent said cutter blade, means positively to move said hold-down means to a downward position during the workstroke of said cutter blade and to release said hold-down means to an upward position during the idle stroke of said cutter blade, whereby said cutter blade is held down during its workstroke and permitted to move to an upward position during its idle stroke.

2. A broaching apparatus comprising horizontal guide means, a crosshead mounted for reciprocation on said horizontal guide means, power means to drive said crosshead, an elongated cutter blade having one end pivotally attached to said crosshead, spring means biasing the distal end of said cutter blade in an upward direction, movable hold-down means positioned adjacent said cutter blade, means driven by said crosshead positively to move said hold-down means to a downward position during the workstroke of said cutter blade and to release said hold-down means to an upward position during the idle stroke of said cutter blade, whereby said cutter blade is held down during its workstroke and permitted to move to an upward position during its idle stroke.

3. A broaching apparatus comprising a frame including a bed having a head member extending upward from one end and a foot member extending upward from the other end, horizontal guide means extending between said head member and said foot member, a crosshead slidably mounted on said horizontal guide means, power means mounted on said foot member to reciprocate said crosshead, elongated cutter blade pivotally attached to said crosshead and extending through an opening in said head member, means urging the distal end of said cutter blade into an upward position, cutter blade hold-down means positioned against said head member and adapted to engage said cutter blade to hold it down, cam means actuated by said crosshead at the ends of its travel alternately to release for upward movement and to lower said hold-down means, whereby said cutter blade is held down during its stroke in one direction and permitted to rise to an upward position during its stroke in the other direction.

4. A broaching apparatus as described in claim 3 wherein said cam means comprises a tapered pin reciprocably held in said head member, said hold-down means having an opening adjacent said pin, means associated with said crosshead for driving said pin into said last-mentioned opening at one end of the travel of said crosshead and to withdraw said pin from said last-mentioned opening at the other end of the travel of said crosshead to release and to lower said hold-down means.

5. A broaching apparatus as described in claim 4 wherein said hold-down means comprises a yoke having a roller journaled between its legs, said roller being adapted to engage the top of said cutter blade, and spring means are provided to urge said hold-down means upward.

6. A broaching apparatus as described in claim 4 wherein said head member has means rotatably mounting a workpiece holding collar and means driven by said crosshead to step said workpiece-holding collar around in rotary movement on alternate strokes of said crosshead.

References Cited in the file of this patent
UNITED STATES PATENTS

| | | |
|---|---|---|
| 1,233,373 | Lapointe | July 17, 1917 |
| 2,684,612 | Psenka et al. | July 27, 1954 |